(No Model.)
W. W. LEMMON.
SEWER TRAP.
No. 280,193. Patented June 26, 1883.
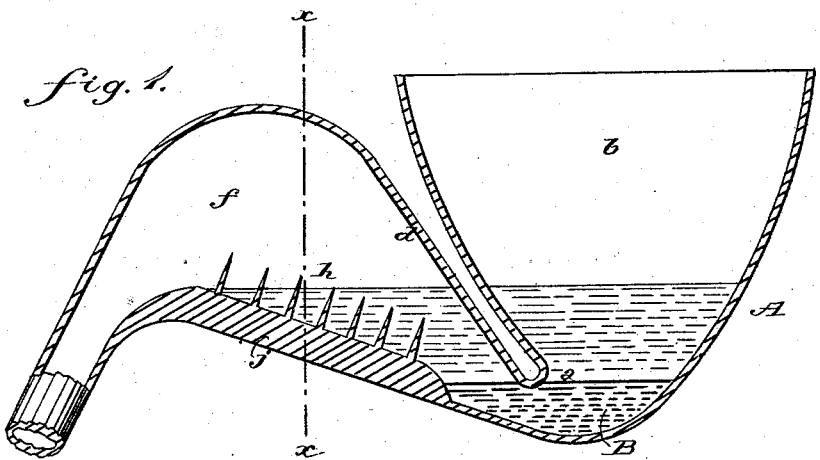
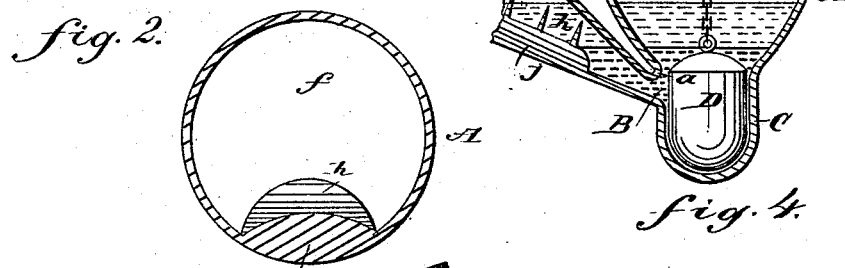
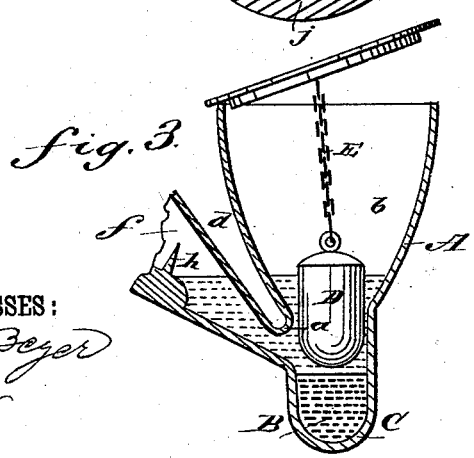
WITNESSES:
INVENTOR:
W. W. Lemmon
BY
ATTORNEYS.

United States Patent Office.

WILLIAM W. LEMMON, OF PORTERSVILLE, INDIANA.

SEWER-TRAP.

SPECIFICATION forming part of Letters Patent No. 280,193, dated June 26, 1883.

Application filed July 31, 1882. (No model.)

*To all whom it may concern:*

Be it known that I, WILLIAM W. LEMMON, of Portersville, in the county of Dubois and State of Indiana, have invented a new and Improved Stench-Trap for Sewers, of which the following is a full, clear, and exact description.

This invention relates to that class of stench-traps for sewers employing a seal of mercury as a preventive against the rising of the obnoxious gases and vapors in the soil-pipe; and it has for its object to effect such result in an approved manner, to prevent loss of the mercury, while the sealing and unsealing operations can be readily and quickly performed; and the nature of my invention consists in the construction of the trap, it being compressed where its pipe connects with its bowl and enlarged at a distant point, said trap and pipe being charged or supplied with mercury.

It also consists in the disposition, in the trap, of a series of dams or plates having each a curved upper edge sloping to the bottom of said trap.

The invention also consists in the combination, with the trap, of a cup adapted to contain mercury, and a plunger fitting into the said cup, whereby when the plunger is lowered into the cup the level of the mercury will be raised sufficiently to form the seal.

Reference is to be had to the accompanying drawings, forming part of this specification, in which similar letters of reference indicate corresponding parts in all the figures.

Figure 1 is a longitudinal sectional elevation of my improved sewer-trap. Fig. 2 is a cross-sectional elevation of the same on the line $xx$, Fig. 1. Fig. 3 is a longitudinal sectional elevation of a modification of the same with the plunger raised. Fig. 4 is a longitudinal elevation of the same with the plunger lowered.

The pipe or trap A is depressed at $a$ at the upper side, so that a passage will be formed which will be narrow vertically, but of considerable width, which passage is between the inlet-chamber $b$ and the discharge-chamber $d$. From the point $a$ the trap A is upwardly bent and enlarged to form the chamber $f$. A quantity of mercury, B, is placed in the trap and fills the same to such an extent as to submerge the downwardly-bent portion $a$, thereby sealing the trap. A series of curved vertical plates, $h$, are secured transversely on the bottom of the chamber $f$, which plates serve as dams for preventing the escape and flow of mercury from the trap. If the flow of water through the trap is sufficient to carry the mercury a short distance with it over one or more of these plates, it will flow down the thickened portion $j$ of the chamber $f$, on which thickened portion the transverse plates $h$ are secured, and will then flow down the channel formed between the sides of the chamber $f$ and the thickened portion $j$ back into the lowest part of the trap.

In the modification shown in Figs. 3 and 4, a cup, C, is formed between the lowest part of the vessel and in communication with the same, which cup C contains the mercury. A plunger, D, which is slightly smaller than the cup C, is provided with a rod or chain, E, for raising or lowering it. When the plunger D is raised, the mercury will all be contained in the cup C, and the level of the mercury will not reach the point $a$, and there will be no waste of mercury, even if the water passes through the trap very rapidly, as the water will pass over the mercury and not through the same. If the trap is to be sealed, the plunger D is lowered into the cup C, and thereby the level of the mercury will be raised sufficiently to immerse the downward-bent portion $a$.

In the construction shown in Fig. 1, as well as in that shown in Figs. 2 and 3, the water contained in the trap will be divided into two parts, one part being in the chamber $f$ and the other part being in the chamber $b$—for example, as shown in Fig. 1—and thus the sewer will be perfectly sealed by the mercury and the water in the chamber $b$, which will be kept uncontaminated.

Having thus fully described my invention, I claim as new and desire to secure by Letters Patent—

1. The trap A, compressed at $a$ and enlarged at $f$, and charged with mercury, substantially as herein shown and described, and for the purpose set forth.

2. The trap A, provided with the series of transverse plates or dams $h$, having upper curved edges sloping to the bottom of the trap, whereby the mercury carried past any one or more of the same will be permitted to flow back into the bottom of the trap, substantially as set forth.

3. The combination, with the trap A, provided with an enlarged part, $f$, and a thickened portion, $j$, at the enlarged part $f$, of the curved transverse partitions $h$ on this thickened part $j$, substantially as herein shown and described, and for the purpose set forth.

4. The combination, with the trap A, provided at the bottom with a cup, C, adapted to contain mercury, of the plunger D, substantially as herein shown and described, and for the purpose set forth.

5. The combination, with the trap A, constructed with a cup, C, adapted to contain mercury, and with an enlarged part, $f$, provided with transverse partitions $h$, of the plunger D, substantially as herein shown and described, and for the purpose set forth.

WILLIAM WALLACE LEMMON.

Witnesses:
FREDRICH G. MUNKEL,
CHRISTIAN SENNING.